United States Patent [19]
You

[11] Patent Number: 5,318,742
[45] Date of Patent: Jun. 7, 1994

[54] METHOD OF MAKING BICYCLE TUBULAR FRAME OF PLASTIC COMPOSITE MATERIAL

[76] Inventor: Chin-San You, No. 3, Lane 1029, Feng-Shyn Rd., Feng Yuan City, Taichung Hsien, Taiwan

[21] Appl. No.: 936,452

[22] Filed: Aug. 28, 1992

[51] Int. Cl.⁵ ............................................. B29C 43/18
[52] U.S. Cl. .................................. 264/516; 264/258; 264/314; 156/156; 156/187; 156/188; 156/194; 156/245; 280/281.1
[58] Field of Search ............... 264/314, 512, 516, 257, 264/258; 156/156, 173, 187, 188, 194, 245; 280/281.1

[56] References Cited
U.S. PATENT DOCUMENTS

| | | | |
|---|---|---|---|
| 3,256,125 | 6/1966 | Tyler | 264/516 |
| 3,493,240 | 2/1970 | Jenks | 264/516 |
| 4,144,632 | 3/1979 | Stroupe | 264/257 |
| 4,889,355 | 12/1989 | Trimble | 264/314 |
| 5,047,263 | 9/1991 | Glemet | 427/203 |
| 5,076,601 | 12/1991 | Duplessis | 264/314 |
| 5,176,868 | 1/1993 | Davis | 264/258 |
| 5,198,058 | 3/1993 | You | 156/173 |

FOREIGN PATENT DOCUMENTS

| | | | |
|---|---|---|---|
| 57-098320 | 6/1982 | Japan | 264/516 |
| 63-092442 | 4/1988 | Japan | 264/512 |

*Primary Examiner*—Catherine Timm
*Attorney, Agent, or Firm*—Browdy and Neimark

[57] ABSTRACT

A method of making a bicycle frame of plastic composite material includes a process in which an inner tube is wrapped orderly with at least a thermoplastic matrix layer and a long fiber reinforcing layer, so as to form a tubular object having a laminated outer shell. The tubular object is placed in a molding tool, which is then heated up to a temperature corresponding to the melting point of the thermoplastic matrix. Under the condition that the heating temperature is maintained, a pressurized gas having a pressure is introduced into the tubular object in such a manner that the pressure is increased progressively and stepwise for a predetermined period of time. The molding tool is finally cooled to permit the removal of a newly-formed bicycle frame, which is light in weight, strong and tough.

9 Claims, 3 Drawing Sheets

5,318,742

METHOD OF MAKING BICYCLE TUBULAR FRAME OF PLASTIC COMPOSITE MATERIAL

FIELD OF THE INVENTION

The present invention relates to a method of making a bicycle frame, and more particularly to a method of making a bicycle tubular frame of thermoplastic composite material.

BACKGROUND OF THE INVENTION

Generally speaking, the method of making a bicycle tubular frame of plastic composite material makes use of a plastic material as a matrix and of a long fiber material as a reinforcing material. In the process, a predetermined number of long fiber fabric sheets preimpregnated in thermosetting plastic, such as epoxy resin, are stacked orderly and windingly to form a laminated tubular object, which is subsequently arranged in a molding tool, in which it takes the form of a bicycle frame under heat and pressure. The tubular frame so made is light in weight and is sufficiently rigid. However, such bicycle frame is defective in that it is not tough enough to provide a bicyclist with a comfortable ride, and that it is a potential source of environmental pollution on the grounds that it is made of a thermosetting plastic material which can not be recycled easily and economically.

SUMMARY OF THE INVENTION

It is, therefore, the primary objective of the present invention to provide a method of making a bicycle tubular frame of a thermoplastic plastic composite material, in which a thermoplastic plastic material is used as a matrix, and in which a long fiber material is used as a reinforcing material. The tubular frame so made is not only light in weight but also sufficiently rigid and tough.

It is another objective of the present invention to provide a method of making a bicycle tubular frame of a thermoplastic plastic composite material, in which an economically recyclable thermoplastic plastic matrix is used.

It is still another objective of the present invention to provide a method of making a bicycle tubular frame of a thermoplastic plastic composite material, which is capable of producing a bicycle tubular frame having a greater lamination number per unit thickness and thereby a greater strength.

In keeping with the principles of the present invention, the foregoing objectives of the present invention are accomplished by a method of making a bicycle tubular frame of plastic composite material, in which a thermoplastic plastic material is used as a matrix, and in which a long fiber material is used as a reinforcing material. The method includes a process of making use of a bendable inner tube made of a temperature resistant inflatable material which is wrapped orderly with at least a thermoplastic plastic matrix layer and a long fiber reinforcing layer, so as to form a tubular object having a layered or laminated outer shell. The tubular object is then arranged in a molding tool provided with a mold cavity having a shape consistent with a shape of the bicycle frame intended to be made. The molding tool is subjected to internal pressure and a heat having a temperature higher than the melting point of the thermoplastic plastic matrix. Under the heat, a pressure is introduced into the tubular object in such a manner that the pressure is increased progressively and stepwise. Finally, the molding tool is cooled to permit the removal of a formed bicycle frame from the mold cavity of the molding tool.

The method of the present invention is unique in that it makes use of a thermoplastic plastic material as a matrix, instead of a thermosetting plastic material which is used in the prior art method. As a result, the bicycle frame made by the method of the present invention is provided with a quality of toughness superior to that of the bicycle frame made by the prior art method. Unlike the bicycle frame of the prior art method, the bicycle frame of the present invention can be recycled easily and economically. In addition, the method of the present invention permits the molten thermoplastic plastic matrix to permeate evenly into the interstices of the fiber bundles making up the long fiber reinforcing material, thereby producing the bicycle frame that is light in weight and is sufficiently rigid. Furthermore, the method of the present invention employs a technique, by which the laminated outer shell is put under pressure stepwise under the condition that the thermoplastic plastic matrix is in a molten state. Therefore, the method of the present invention is capable of producing a bicycle frame having a greater lamination number per unit thickness and thereby a greater strength.

DETAILED DESCRIPTION OF THE PREFERRED EMBODIMENT

Figure 1:
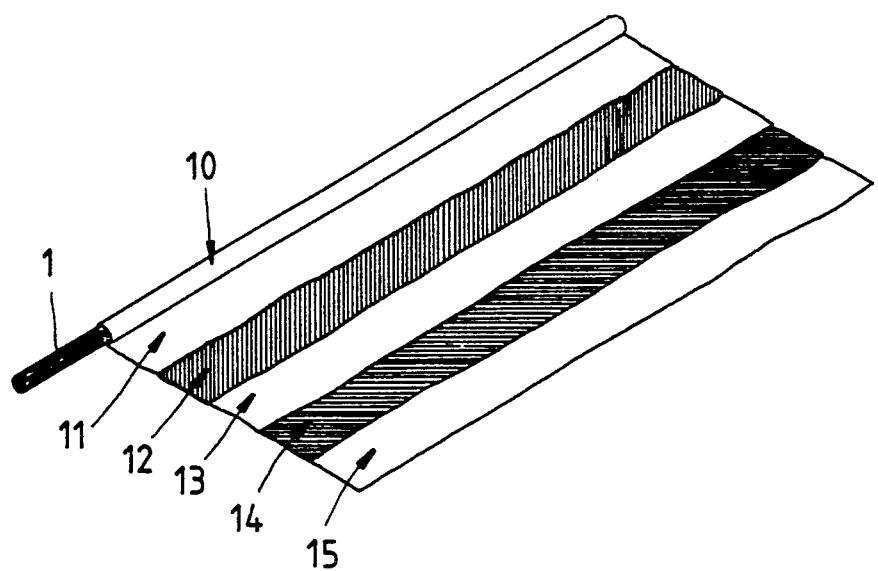
FIG. 1 is a schematic view showing the composition of a tubular object having a laminated outer shell, according to a preferred embodiment of the present invention.
Figure 2:
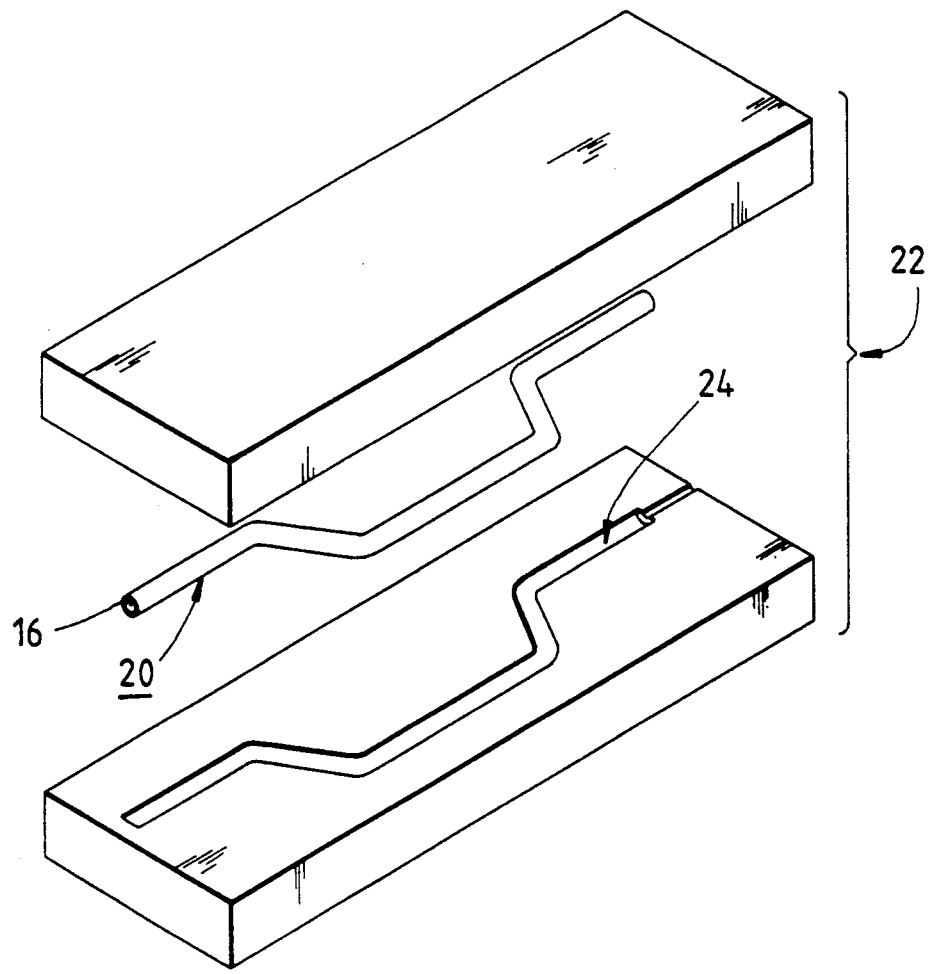
FIG. 2 is a schematic view showing that the tubular object of the preferred embodiment of the present invention is being placed in a mold cavity of a molding tool.

The drawings provided herein are used to illustrate a method of making a bicycle handlebar, according to the preferred embodiment of the present invention.

An inner tube 10 of a high-temperature resistant elastomeric material, such as silicone rubber, is wrapped windingly and orderly with a first, a second and a third thermoplastic plastic matrix layers 11, 13 and 15, and with a first and a second long fiber reinforcing layers 12 and 14, so as to form a tubular object 20 having a laminated or layered outer shell 16.

Figure 5:
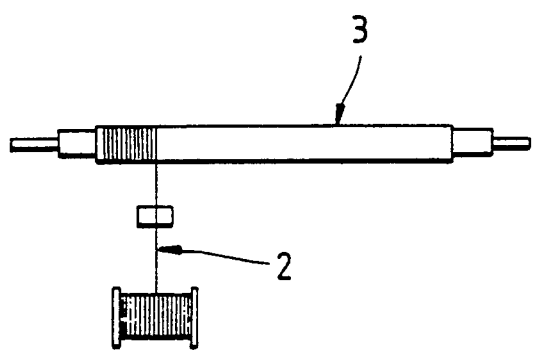
FIG. 5 is a schematic view showing that a long fiber bundle is attached windingly to the surface of a thermoplastic plastic film, according to the preferred embodiment of the present invention.
Figure 6:
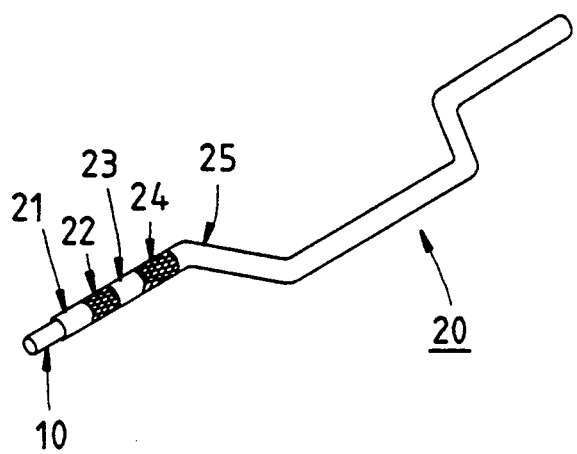
FIG. 6 is a schematic view showing that an inner tube is fitted over orderly with thermoplastic plastic thin tubes and long fiber fabric tubes, according to the preferred embodiment of the present invention.
Figure 7:
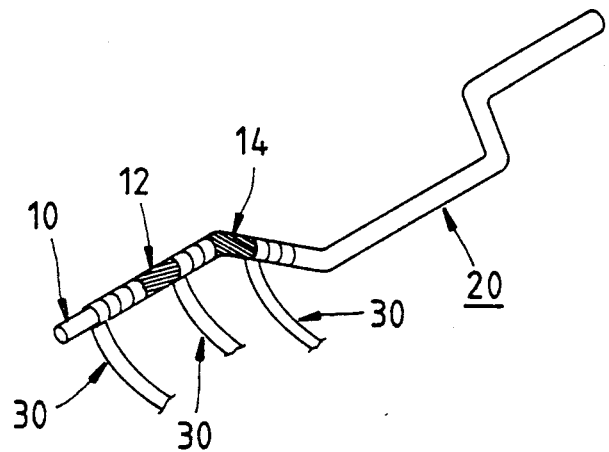
FIG. 7 is a schematic view showing that the thermoplastic plastic matrix layer is formed by thermoplastic plastic ribbons, according to the preferred embodiment of the present invention.
Figure 8:
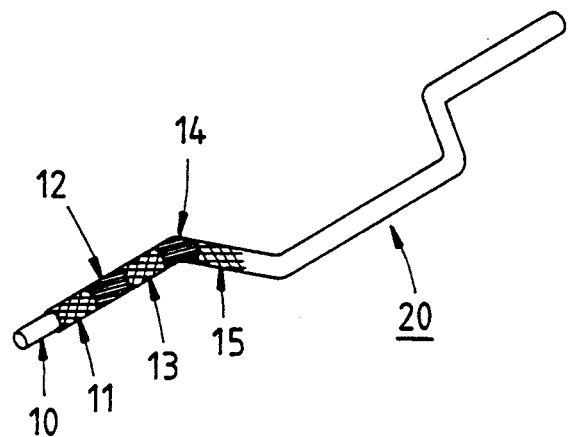
FIG. 8 is a schematic view showing that each of the thermoplastic plastic matrix layers has a netlike surface.

It is suggested that the process of forming a tubular object 20 described above can be assisted by a metal rod 1 that is fitted into the inner tube 10, as shown in FIG. 1. Each of the thermoplastic plastic matrix layers 11, 13 and 15 is made of a flat and spread piece of polyamide (nylon), while each of the long fiber reinforcing layers 12 and 14, which are 0.1-10 m in length, is made of carbon fiber, or boron fiber, or glass fiber. In fact, a long fiber bundle 2 as shown in FIG. 5 may be adhered in advance to a flat and spread thermoplastic plastic film to form a thin board not shown; or a long fiber bundle 2 may be wrapped about a plastic film 3 as shown in FIG. 5. The inner tube 10 is then wrapped windingly around with such thin board. In addition, the inner tube 10 may be fitted over orderly with three thermoplastic plastic thin tubes 21, 23 and 25, and with two long fiber fabric tubes 22 and 24, as shown in FIG. 6. Furthermore, the thermoplastic plastic matrix layers 11, 13 and 15 may be formed by thermoplastic plastic ribbons 30, as shown in FIG. 7. Each of the thermoplastic plastic matrix layers 11, 13 and 15 is provided with a netlike surface with a view to accelerating the melting process of the thermoplastic plastic matrix, as shown in FIG. 8.

Figure 3:
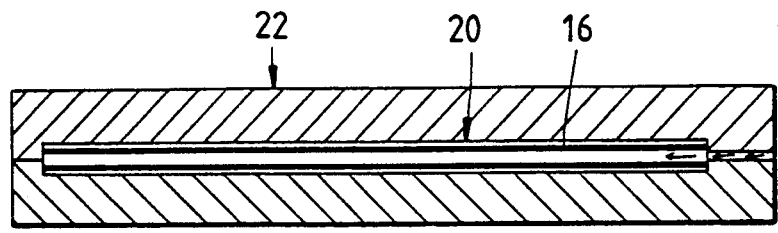
FIG. 3 is a sectional view of the molding tool containing the tubular body of the preferred embodiment of the present invention.
Figure 4:
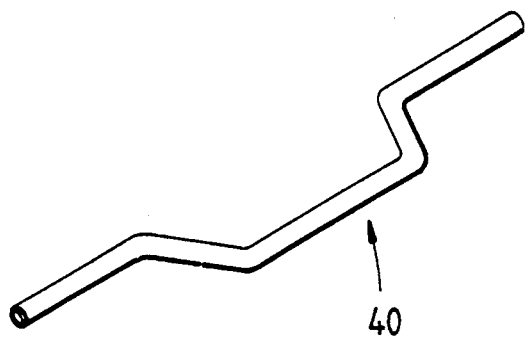
FIG. 4 shows a perspective view of a product of the preferred embodiment of the present invention.

The tubular object 20 so made is then arranged in a mold cavity 24 of a molding tool 22, with the mold cavity 24 having a shape consistent with that of a bicycle handlebar intended to be made. The molding tool containing the tubular object 20 is closed under pressure and is then heated up to 220 degrees in Celsius to soften or melt the thermoplastic. In the meantime, a first pressurized gas having a pressure of 1-3 kg/cm is introduced into the tubular object 20. The first pressurized gas forces the molten thermoplastic plastic material of the thermoplastic plastic matrix layers 11, 13 and 15 to permeate uniformly the interstices of the long fiber bundles making up the long fiber reinforcing layers 12 and 14. Such permeating process of the molten thermoplastic plastic material is permitted to last for a period of about five minutes. A second pressurized gas having a pressure of 5-10 kg/cm, as indicated by arrows in FIG. 3, is introduced into the tubular object 20 so as to force the molten thermoplastic plastic material to diffuse thoroughly into the interstices of the long fiber bundles, and to force the long fiber reinforcing layers 12 and 14 to attach intimately to the wall of the mold cavity 24. If necessary, a third pressurized gas having a pressure of 10-15 kg/cm may be introduced to force the laminated layers to unite firmly together.

The molding tool 22 is cooled to permit the solidification of the molten thermoplastic plastic material permeating the interstices of the fiber bundles to come into being. Upon the completion of such process, the molding tool 22 is opened to remove therefrom a bicycle handlebar 40.

The method of the present invention described above has advantages over the prior art method. In the present invention, the thermoplastic plastic material is used as a matrix, which is responsible for providing the bicycle frame with an excellent quality of toughness. In addition, the thermoplastic plastic matrix of the present invention can be easily recycled by means of a process, in which the matrix is subjected to heat. Furthermore, the thermoplastic plastic matrix in the laminated structure of the present invention is held firmly together, while the long fiber reinforcing layers are united intimately by the internal pressure. In other words, the bicycle frame produced by the method of the present invention is relatively stronger than the bicycle frame produced by the prior art method, in view of the fact that the bicycle frame of the present invention has relatively more lamination layers.

What is claimed is:

1. A method of making a bicycle tubular frame of plastic composite material, in which a thermoplastic plastic material is used as a matrix, and in which a long fiber material is used as a reinforcing material, said method comprising the steps of:
   (a) providing an inner tube of a bendable and heat-resistant inflatable material;
   (b) covering orderly said inner tube with at least a first plastic matrix layer composed of said thermoplastic plastic material, a first long fiber reinforcing layer, a second plastic matrix layer composed of said thermoplastic plastic material and a second long fiber reinforcing layer, so as to form a tubular object having a layered outer shell;
   (c) placing said tubular object in a mold cavity of a molding tool, with said mold cavity having a shape in agreement with a shape of said bicycle tubular frame;
   (d) heating said molding tool to a temperature higher than a melting point of said thermoplastic plastic material;
   (e) introducing gas to exert a pressure within said tubular object in such a manner that said pressure is increased progressively and stepwise, under a condition that said temperature is maintained, comprising ($e_1$) first pressurizing said tubular object at a first gas pressure for a time and at a temperature sufficient to melt said first and second plastic matrix layers and cause the resultant molten thermoplastic material to permeate uniformly interstices of said first and second long fiber reinforcing layers, and ($e_2$) increasing said pressure so as to force the molten thermoplastic material to diffuse thoroughly into said interstices and to force the second long fiber reinforcing layer to attach intimately to said mold cavity; and
   (f) cooling said molding tool to permit the removal of said bicycle tubular frame from said mold cavity.

2. The method of making a bicycle tubular frame of plastic composite material according to claim 1 wherein said layers of said reinforcing material and said layers of said matrix are attached orderly onto a thermoplastic plastic film to form a thin board, which is then wrapped windingly onto said tubular object.

3. The method of making a bicycle tubular frame of plastic composite material according to claim 1 wherein at least one said layer of said matrix takes the form of a thin tube of said thermoplastic plastic material.

4. The method of making a bicycle tubular frame of plastic composite material according to claim 1 wherein at least one said layer of said reinforcing material takes the form of a fabric of said long fiber material.

5. The method of making a bicycle tubular frame of plastic composite material according to claim 1 wherein at least one said layer of said matrix has a netlike surface.

6. A method according to claim 1, wherein said step ($e_1$) is carried out at a pressure of about 1-3 kg/cm for a period of about five minutes, and said step ($e_2$) is carried out at an internal pressure of about 5-10 kg/cm.

7. A method according to claim 1, wherein said step (e) further comprises:

($e_3$) increasing gas pressure to force the layers to unite firmly together.

8. A method according to claim 1, wherein said step ($e_3$) is carried out at an internal gas pressure of 10–15 kg/cm.

9. A method according to claim 1, wherein said heat-resistant inflatable material is an elastomer.

* * * * *